A. C. SCHUERMANN.

COMPRESSION STOP AND WASTE.

APPLICATION FILED AUG. 31, 1907.

Reissued July 19, 1910.

13,135.

3 SHEETS—SHEET 1.

WITNESSES:

Henry D. Plate.

George S. Haley

INVENTOR:

Anton C. Schuermann

BY

Collamer & Co., HIS ATTORNEYS.

A. C. SCHUERMANN.

COMPRESSION STOP AND WASTE.

APPLICATION FILED AUG. 31, 1907.

Reissued July 19, 1910.

13,135.

3 SHEETS—SHEET 2.

WITNESSES:

Henry D. Plate.

George S. Haley

INVENTOR:

Anton C. Schuermann

BY

Collamer & Co., HIS ATTORNEYS.

A. C. SCHUERMANN.

COMPRESSION STOP AND WASTE.

APPLICATION FILED AUG. 31, 1907

Reissued July 19, 1910.

13,135.

3 SHEETS—SHEET 3.

WITNESSES:

Henry D. Plate.

George S. Haley

INVENTOR:

Anton C. Schuermann,

BY

Collamer & Co., HIS ATTORNEYS.

UNITED STATES PATENT OFFICE.

ANTON C. SCHUERMANN, OF DECATUR, ILLINOIS, ASSIGNOR TO H. MUELLER MANUFACTURING COMPANY, OF DECATUR, ILLINOIS, A CORPORATION OF ILLINOIS.

COMPRESSION STOP AND WASTE.

13,135. Specification of Reissued Letters Patent. Reissued July 19, 1910.

Original No. 843,496, dated February 5, 1907, Serial No. 366,311. Application for reissue filed August 31, 1907. Serial No. 390,995.

*To all whom it may concern:*

Be it known that I, ANTON C. SCHUERMANN, a resident of Decatur, in the county of Macon and State of Illinois, have invented a certain new and useful Compression Stop and Waste, of which the following is a specification.

The invention is applicable to stop and waste cocks or faucets, to hydrants, and to other appliances that act on the stop and waste principle.

The objects of this invention are to provide means for moving one valve straight toward and from its seat, while the other is carried in a collar on the stem and ground upon its seat; to provide a double waste valve which comprises a primary valve adapted to be ground upon its seat and a secondary valve adapted to be pressed straight against its seat, and both valves when closed clamped against opposite sides of a single ring; to combine in the structure positive means whereby initial pressure will never reach the aperture in the bonnet through which the stem projects; to produce a device of this character wherein the main valve and the waste valve—or at least one of two waste valves—are never open at the same time; and to insure the successful operation of the device as a compression stop and waste in case the spring should break or become inoperative.

The invention is exemplified in the structure hereinafter described, and it is defined in the appended claims.

Figures 1, 2:
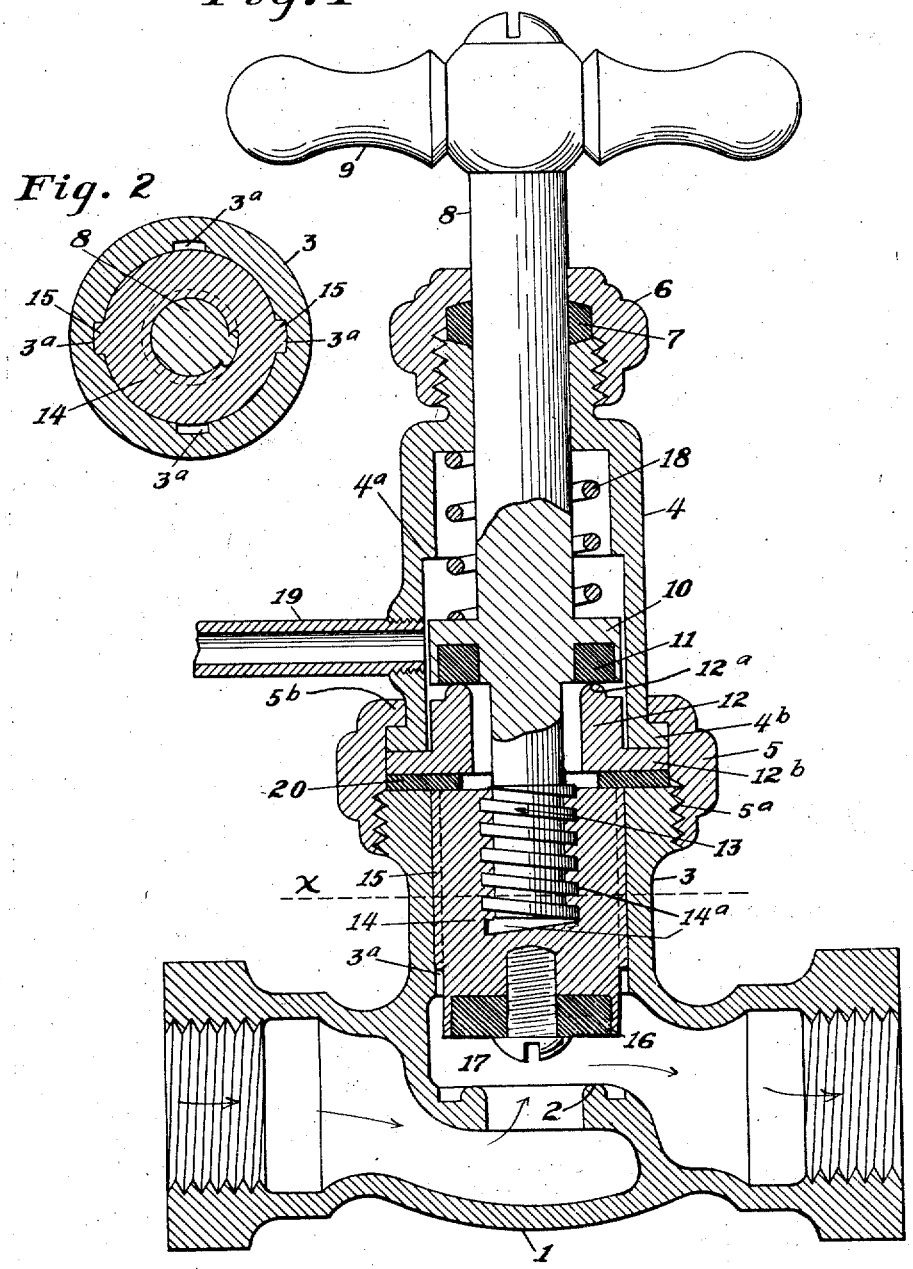
Figure 3:
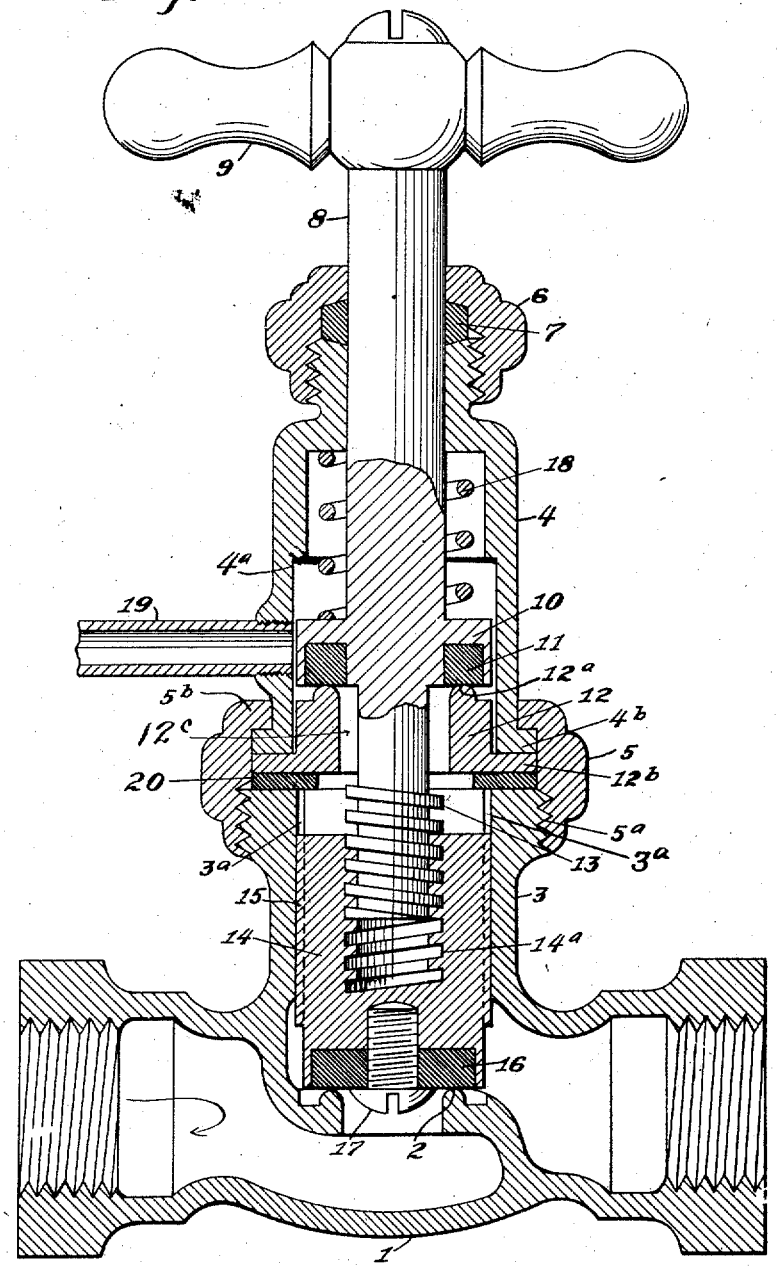
Figure 4:
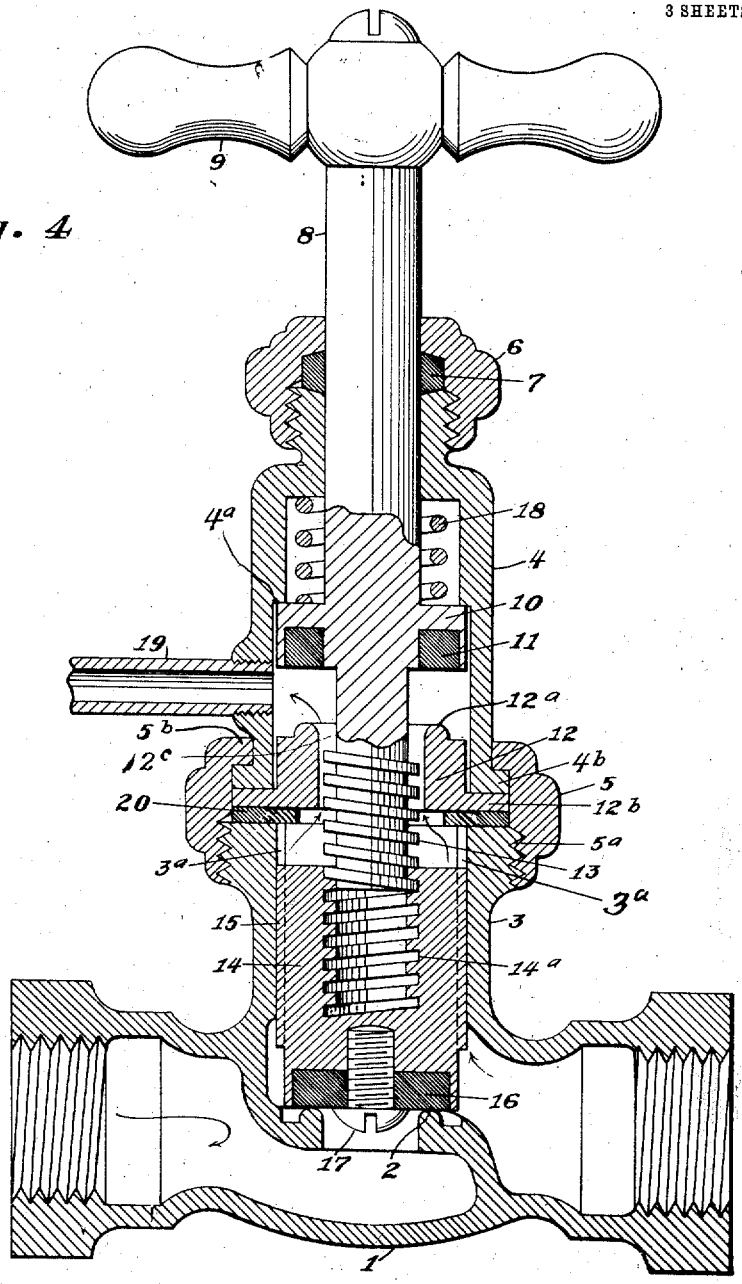

In the drawings forming part of this specification, Figure 1 is a central section lengthwise of a stop and waste in which my invention is embodied, the main valve being shown open and the waste-valve closed. Figure 2 is a cross-section on line $x$ in Figure 1. Figure 3 is a central section lengthwise of the cock, showing an intermediate position with both valves closed. Figure 4 is a similar section showing the waste-valve open and the main valve closed.

The body 1 of the cock has a partition provided with an opening around which is formed a valve seat 2, and a cylindrical lateral extension 3 in axial alinement with said seat. The cap or bonnet 4 is detachably connected with said extension, the connection herein shown being by means of a union-nut 5 screwed as at $5^a$ to the extension and having an interior flange $5^b$ engaging an exterior flange $4^b$ on the bonnet with suitable packing 20 preferably interposed between the connected members. The bonnet has an internal shoulder $4^a$ for a purpose to be described below, a packing-nut 6 is screwed onto its upper end, and packing 7 is interposed between said end and nut. A valve-stem 8 extends through the nut, packing, and bonnet, and it is screw-threaded at 13 at its lower end to engage the internal threads $14^a$ in a plunger 14. A handle 9 is secured to the upper end of the stem, and a collar 10 is formed on or rigidly secured to the stem between its ends and in position to engage said shoulder $4^a$. A spring 18 is interposed between the collar 10 and the upper end of the bonnet, being by preference a helical expansive spring surrounding the stem, but as shown below this spring is not always necessary.

A ring 12 is fitted rigidly within the bonnet near its lower end and has a central hole $12^c$ larger than the stem 8 and preferably also larger than its threads 13. As shown, this ring has a flat lower face and is provided with an external flange $12^b$ extending beneath the flange $4^b$ of the bonnet and above the upper end of the extension 3 and over the packing 20, and the parts are held together by the union-nut 5. Around the hole $12^c$ a valve-seat $12^a$ is formed on the upper face of the ring, and above this seat a waste-pipe 19 penetrates the wall of the bonnet. By preference the collar 10 has a downwardly-presented annular recess, and a valve-ring 11 is held in said recess in position to close against the seat $12^a$. This ring and seat constitute the waste-valve, or primary waste-valve if a secondary waste-valve is employed as described below.

The extension 3 has a plurality of internal lengthwise grooves, preferably four, as shown at $3^a$ in Figure 2; and the plunger 14 fits loosely within the extension and has a less number of ribs 15, preferably two, which slide in two of the grooves $3^a$ and prevent the plunger from turning while the other two form waste-passages. A valve-disk 16 is held in the lower end of plunger 14 by means of a screw 17, and is adapted to close against the seat 2 to form the main valve. It will be observed that this valve closes straight upon its seat by reason of the grooves and ribs, whereas the waste-valve is ground upon its seat as it is turned by the stem.

By preference the washer 20 (which may be of fibre or other suitable material) not only constitutes a packing as already described, but is continued inward along the lower face of the ring 12 nearly to its hole $12^c$, so that it passes over all the grooves $3^a$ and stands above the plunger. When the latter is drawn upward by the screw as shown in Figure 1, the washer is clamped between it and the ring so as to close the unoccupied grooves $3^a$ (which are waste-passages), and these elements therefore form the waste-valve if the one above described is not employed, or form a secondary waste-valve if the primary waste-valve is employed.

As shown in Figure 1, the waste-valve 11 rests on its seat $12^a$ and holds the stem from further descent, while its threads are screwed into those within the plunger sufficiently far to raise the upper end of the latter against the ring 12, or against the washer 20 if it be wide enough. Under these conditions the ring is clamped between the waste-valve 11 and the plunger, and the waste-valve is held securely closed while the main valve is held open and the fluid under pressure passes through the cock in an obvious manner as shown by the arrows. If said washer 20 is as wide as illustrated, the upper end of the plunger will clamp the washer tightly against the lower face of the ring, though the fact that the hole in the washer is larger than that in the ring and larger than the threads 13 will prevent this clamping action from compressing the washer sufficiently to cause it to partly cover the hole or interfere with the threads. The plunger moves straight upward without grinding, while its rise is caused by the rotation of the stem and collar and hence by the grinding of the latter or its valve-ring 11 upon the fixed ring 12. In order that the pressure of the fluid may never reach the packing 7, the collar 10 should be integral with the stem.

When it is desired to close the main valve, the stem is turned in a direction to unscrew the threads from the plunger, the spring 18 holding the waste-valve 11 seated. The ribs 15 move down grooves $3^a$ and hold the plunger from turning, and the plunger descends until the valve-disk 16 is in contact with seat 2, as shown in Figure 3. Here the parts are in an intermediate position as a compression stop and waste, but as a simple cock the valve has been closed and the stem need be turned no further if the initial pressure is not greater than the force of the spring. Should sudden back-pressure occur, it might open the waste-valve 11 slightly but would immediately escape out the outlet 19 or mingle with the initial pressure; and should the pressure become excessive or the spring break, the plunger would rise and the secondary waste-valve would positively close. With the main valve closed, when it is desired to open the waste-valve 11, the rotation of the stem is continued in a direction to further unscrew the stem from the plunger. The contact of the main-valve with its seat prevents further descent of the plunger, and the waste-valve is therefore raised against the action of spring 18. When the waste-valve is raised until the collar 10 contacts with shoulder $4^a$, the main valve is held positively closed independent of the action of the spring, and the waste-valve is of course held positively opened, as shown in Figure 4. When the waste-valve is raised from its seat, a waste-passage is established through the unobstructed grooves $3^a$ in extension 3, through the hole $12^c$ in ring 12, and through pipe or outlet 19. In closing the waste-valve preparatory to opening the main valve the spring follows the collar 10 and presses the main valve against its seat until the waste-valve is entirely closed, and hence the two valves are never open at the same time so long as the spring is operative.

If the spring should break, the valves would still operate as in an ordinary stop and waste, except that the action would then be as follows: The initial pressure would probably hold the main-valve open as shown in Figure 1, and the first turning of the stem would unscrew its threads from the plunger and unseat the primary waste-valve, although the secondary waste-valve would still prevent the pressure from reaching the packing. When the collar contacted with the shoulder $4^a$ the outlet 19 would be open, and further rotation of the stem would first open the secondary waste-valve and then close the main-valve. Thus it will be seen that without the spring, or if it should become broken or weaker than the pressure, the latter would have an exit through the outlet 19 before it could reach the packing 6, and this also would be true even if the collar did not contain a waste-valve. It follows, therefore, that either waste-valve could be employed without the other; that if the spring should break or become weakened the device would yet operate as an ordinary stop and waste, but it would be better then to employ the secondary waste-valve because it holds the waste-passage through the grooves closed until the collar has uncovered the outlet 19; that it is preferable to employ both waste-valves, because the clamping of the ring 12 between them by direct pressure on one side and grinding action on the other constitutes a reliable seal for the waste-outlet however worn the parts may have become; and that in the highest type of the device wherein the spring is used with both waste-valves, the advantages are many as above described.

It will be observed that shoulder 4ª acts as a positive stop for the waste valve so that when the latter in rising reaches this stop the continued turning of the stem positively presses the main valve against its seat. Also the secondary waste valve above the main valve acts as a positive stop for the latter, so that when said main valve in rising strikes this stop further turning of the stem in the proper direction forcibly grinds the waste valve upon its seat.

The threads on the valve-stem are preferably left-handed so that the stem may be rotated in the usual way to open and close the valves. Separation of the bonnet 4 from the extension 3 of the cock-body releases the ring 12 and gives access to all interior parts, and this makes substitution of a new ring or washer for a worn one easy of accomplishment.

The invention is useful in yard-hydrants, wherein it prevents leakage under pressure when the main valve is partly open as in filling a bucket or pitcher. With the ordinary stop and waste, so long as the main valve is only partly open the waste-valve will discharge water under pressure, and this will in time raise the line of soil saturation so high as to prevent water in the hydrant from discharging when the main valve is closed, and when a freeze comes the hydrant suffers. With my improved stop and waste, partial opening of the main-valve (which would be from the position shown in Figure 3) does not open the waste-valve, and as there is also no leakage through the packing 6 there will be no soil saturation and disastrous effects. But the invention finds its greatest usefulness under conditions where the initial pressure it high or of long duration, or both, and perhaps with the element of variability—all of which factors find in the double waste-valve and the other details of construction a positive safeguard against leakage of the waste.

I claim:

1. In a compression stop and waste, the combination with a body having a through passage provided with a main valve seat, an extension of the body in line with said seat and communicating with a waste outlet, and a fixed ring within the extension, the latter having grooves and the ring having a bore constituting waste passages; of a plunger having ribs movable in certain of said grooves, a main valve on the plunger, a stem extending loosely through the bore of the ring and having a threaded connection with the plunger, and a washer adapted to be clamped between the ring and plunger when the latter is fully raised and to serve as a waste valve for closing said grooves.

2. In a compression stop and waste, the combination with a body having a through passage provided with a main valve seat, an extension of the body in line with said seat and communicating with a waste outlet, and a fixed ring within the extension, the latter having grooves and the ring having a bore constituting waste passages; of a plunger having ribs movable in certain of said grooves, a main valve on the plunger, a stem extending loosely through the bore of the ring and having a threaded connection with the plunger, two waste valves one above and one below said ring, the lowermost being clamped against it to close said grooves when the plunger is fully raised, and means on the stem for grinding the uppermost waste valve against the ring at this time.

3. In a compression stop and waste, the combination with a body having a through passage provided with a main valve seat, an extension of the body in line with said seat and communicating with a waste outlet, and a fixed ring within the extension, the latter having grooves and the ring having a bore constituting waste passages; of a plunger having ribs movable in certain of said grooves, a main valve on the plunger, a stem extending loosely through the bore of the ring and having a threaded connection with the plunger, two waste valves one above and one below said ring, the lowermost being clamped against it to close said grooves when the plunger is fully raised, and a collar on the ring within which the uppermost waste valve is seated.

4. In a compression stop and waste, the combination with a body having a through passage provided with a main-valve seat, an extension of the body in line with said seat and exteriorly threaded, a bonnet provided with a waste-outlet and having an exterior flange, a waste-valve seat, a ring carrying said seat and having a flange between that on the bonnet and the end of the extension, and a union-nut screwed on the extension and having a flange clamping that on the bonnet against that on the ring of a plunger movable in the extension, a main-valve on the plunger adapted to close against its seat, a stem extending through the bonnet and having threaded connections with the plunger, and a waste-valve fixedly carried by the stem and adapted to close against the waste valve seat.

5. In a compression stop and waste, the combination with a body having a through passage provided with a main-valve seat, an extension of the body in line with said seat and having longitudinal grooves, a bonnet provided with a waste-outlet, a waste-valve seat, a ring carrying said seat, a washer between the ring and the extension and passing over the upper end of said grooves, and means for clamping the ring, washer and bonnet to the extension; of an interiorly-screw threaded plunger slidable in the extension and adapted to contact with the washer, ribs thereon engaging certain of said grooves leaving the others open as waste passages, a main valve on the plunger adapted to close against the main-valve seat, a stem extending through the bonnet and ring and threaded into the plunger, and a waste-valve fixedly carried by the stem and adapted to close against the waste-valve seat.

6. In a compression stop and waste, the combination with a body having a main-valve seat, an extension in line with said seat and having longitudinal grooves a washer over said grooves a waste-valve seat, a ring carrying said seat, and means for clamping the ring and washer to the extension; of an interiorly-screw threaded plunger slidable in the extension and adapted to contact with the washer, ribs thereon engaging certain of said grooves leaving the others open as waste passages, a main valve on the plunger adapted to close against the main valve seat, a stem extending through the ring and threaded into the plunger, and a waste-valve carried by the stem and adapted to close against the waste-valve seat.

7. In a compression stop and waste, the combination with a body having a main valve-seat, an extension of the body in line with said seat and having longitudinal grooves, a waste-valve seat, a ring carrying said seat, and means for clamping the ring to the extension, and the washer between them; of an interiorly-threaded plunger slidable in the extension and adapted to contact with the washer, ribs thereon engaging certain of said grooves and leaving the others open as waste passages, a main-valve adapted to be closed by the plunger against the main-valve seat, a stem extending through the ring and threaded into the plunger, and a waste-valve surrounding the stem and adapted to be closed against the waste-valve seat when the stem is screwed into the plunger.

8. In a compression stop and waste, the combination with a body having a main-valve seat, an extension of the body communicating at its outer end with a waste-outlet and having internal grooves, and a ring having a hole forming communication between said outlet and grooves; of a plunger movable in the extension and having projections engaging some of its grooves leaving the others open as waste passages, a main valve adapted to be closed against the main valve seat when the plunger is moved to one extreme, a stem extending loosely through said hole, a screw connection between the stem and plunger, and a washer adapted to be clamped against the lower face of said ring to close said passages when the plunger is moved to its other extreme.

9. In a compression stop and waste, the combination with a body having two valve seats, and a positive stop for and in opposition to each seat; of two valves each located between its seat and its stop, one being movable and non-rotary and the other movable and rotary, and means whereby the turning of the latter will move the former.

10. In a compression stop and waste, the combination with a body having two valve seats, and a positive stop for and in opposition to each seat; of two valves each located between its seat and its stop, one being movable and non-rotary and the other movable and rotary, and means whereby the turning of the latter one way will first move the former from its stop to its seat, then move itself from its seat to its stop, and then more tightly seat the former.

11. In a compression stop and waste, the combination with a body having a through passage with a main valve seat, a lateral extension of the body in line with said seat, a waste outlet communicating with said extension, and a waste valve seat between said outlet and main valve seat; of independent valves for said seats, a spring for assisting in the closing of the waste valve, means for moving one of the valves from the exterior, a screw connection between the valves, and positive stops for checking the opening movement of each valve whereby when one valve is so checked the other can be tightly seated by proper manipulation of said means.

12. In a compression stop and waste, the combination with a body having a through passage with a main valve seat, a lateral extension of the body in line with said seat, a waste outlet communicating with said extension, and a waste valve seat between said outlet and main valve seat; of independent valves for said seats, a spring for assisting in the closing of the waste valve, a stem and handle for moving the waste valve from the exterior, a screw connection between the valves, and positive stops for checking the opening movement of both valves whereby when the main valve is so checked the waste valve can be tightly seated by proper manipulation of said handle.

13. In a compression stop and waste, the combination with a body having a main valve seat and a positive stop adjacent it, a lateral extension of the body having a waste valve seat and an internal shoulder constituting a positive stop adjacent it, and a waste outlet with which said extension communicates; of independent waste and main valves respectively between their adjacent seats and stops, a stem for moving the waste valve from the exterior of the body, a screw connection between said stem and main valve, and means for guiding the latter straight to and from its seat.

14. In a compression stop and waste, the combination with a body having a main valve seat and a positive stop adjacent it, a lateral extension of the body having a waste valve seat and an internal shoulder constituting a positive stop adjacent it, and a waste outlet with which said extension communicates; of independent waste and main valves respectively between their adjacent seats and stops, a cap on the extension, an expansive spring between the cap and waste valve for assisting in its closing, a stem for moving the waste valve from the exterior of the body, a screw connection between said stem and main valve, and means for guiding the latter straight to and from its seat.

15. In a compression stop and waste, the combination with a body having a through passage with a main valve seat, a lateral extension of the body in line with said seat, a waste outlet communicating with said extension, and a waste valve seat between said outlet and main valve seat; of independent valves for said seats, both closing against the pressure, a spring for assisting in the closing of the waste valve, means for moving one of the valves from the exterior, a screw connection between the valves, and positive stops for checking the opening movement of each valve whereby when one valve is so checked the other can be tightly seated by proper manipulation of said means.

16. In a compression stop and waste, the combination with a body having a through passage with a main valve seat, a lateral extension of the body in line with said seat, a waste outlet communicating with said extension, and a waste valve seat between said outlet and main valve seat; of independent valves for said seats, both closing against the pressure, a spring for assisting in the closing of the waste valve, a stem and handle for moving the waste valve from the exterior, a screw connection between the valves, and positive stops for checking the opening movement of both valves whereby when the main valve is so checked the waste valve can be tightly seated by proper manipulation of said handle.

17. In a compression stop and waste, the combination with a body having a main valve seat and a positive stop adjacent it, a lateral extension of the body having a waste valve seat and an internal shoulder constituting a positive stop adjacent it, and a waste outlet with which said extension communicates; of independent waste and main valves respectively between their adjacent seats and stops both closing against the pressure, a stem for moving the waste valve from the exterior of the body, a screw connection between said stem and main valve, and means of guiding the latter straight to and from its seat.

18. In a compression stop and waste, the combination with a body having a main valve seat and a positive stop adjacent it, a lateral extension of the body having a waste valve seat and an internal shoulder constituting a positive stop adjacent it, and a waste outlet with which said extension communicates; of independent waste and main valves respectively between their adjacent seats and stops, both closing against the pressure, a cap on the extension, an expansive spring between the cap and waste valve for assisting it in its closing, a stem for moving the waste valve from the exterior of the body, a screw connection between said stem and main valve, and means for guiding the latter straight to and from its seat.

19. In a compression stop and waste, the combination with a body having two alined valve seats, of valves adapted to close in the same direction against said seats, two members respectively carrying said valves, both valves being movable in directions axially of the alined seats, one valve being rotary and the other non-rotary, the extremes of longitudinal movement of the valves being provided by non-moving parts.

20. In a compression stop and waste, the combination with a body having two alined valve seats, of valves adapted to close in the same direction against said seats, two members respectively carrying said valves, both valves being movable in directions axially of the alined seats, one valve being rotary and the other non-rotary, and non-movable means for limiting the longitudinal movement of the valves.

21. In a compression stop and waste, the combination with a body having two alined valve seats, of valves adapted to close in the same direction against said seats, two members respectively carrying said valves, both valves being movable in directions axially of the alined seats, one valve being rotary and the other non-rotary, and a positive stop in the path of longitudinal movement of each seat valve, said stop limiting the longitudinal movement of the valve.

22. In a compression stop and waste, the combination of a body having a through passage and a main-valve seat, a lateral extension of the body in line with said seat, a bonnet attached to the extension and provided with a waste-outlet, a waste valve seat, a non-rotatable threaded plunger movable in the extension and carrying a valve-face, waste ports in said extension exterior of said plunger, a stem extending through the bonnet and having its inner end threaded to engage the plunger, a valve-face on said stem to coöperate with the waste valve seat, said plunger being movable to close the waste ports.

23. In a compression stop and waste, a main valve seat, a waste valve seat in axial alinement therewith, a main valve member having a non-rotatable movement in a direction corresponding to the axis of the main valve seat, waste ports in the body exterior of the main valve, a stem coöperating with the main valve to provide movements of the latter axially by a rotative movement of the stem, and a waste valve carried by said stem and adapted to be moved toward and away from the waste valve seat by the rotative movements of the stem, said main valve operating to close the waste ports when moved to the limit of one direction of longitudinal movement.

24. In a compression stop and waste, a main valve seat, a waste valve seat in axial alinement therewith, a main valve member having a non-rotatable movement in a direction corresponding to the axis of the main valve seat, waste ports in the body exterior of the main valve, a stem coöperating with the main valve to provide movements of the latter axially by a rotative movement of the stem, and a waste valve carried by said stem and adapted to be moved toward and away from the waste valve seat by the rotative movements of the stem, said main valve being movable between two opposing fixed portions of the body, the extremes of such movements closing the main valve port and the waste ports respectively.

25. In a compression stop and waste, the combination with a body having a through passage and a main-valve seat, a lateral extension thereof, a plunger guided in said extension and forming therewith a waste passage, a bonnet clamped to the extension and having a waste-outlet, and a main valve adapted to be seated by the plunger; of a stem extending through the bonnet and having a collar, a spring in the bonnet pressing the stem downward, a screw connection between the plunger and stem, a fixed-ring surrounding the stem and having a flange clamped to the extension by the bonnet, a waste-valve seat on the upper face of said fixed-ring, a primary waste-valve held by said collar above the seat on said fixed-ring, and a secondary waste-valve seat held at its outer edge between the extension and the flange of said fixed-ring with its body above said waste-passage whereby both waste-valves are closed against the fixed-ring when the plunger and collar are approximated.

26. In a compression stop and waste, the combination with a body having a through passage and a main-valve seat, a lateral extension thereof communicating with a waste-outlet, a plunger guided in said extension and forming therewith a waste passage, and a main valve adapted to be seated by the plunger; of a stem having a collar, a spring pressing the stem downward, a screw connection between the plunger and stem, a fixed-ring surrounding the stem and clamped to the extension, a waste-valve seat on the upper face of said fixed-ring, a primary waste-valve held by said collar above the seat on said fixed-ring, and a secondary waste-valve seat held at its outer edge between the extension and the fixed-ring with its body above said waste-passage whereby both waste-valves are closed against the fixed-ring when the plunger and collar are approximated.

27. In a compression stop and waste, the combination with a body having a through passage and a main-valve seat, a lateral extension thereof communicating with a waste-outlet, a plunger guided in said extension and forming therewith a waste passage, and a main valve adapted to be seated by the plunger; of a stem having a collar, a screw connection between the plunger and stem, a fixed-ring surrounding the stem, and clamped to the extension, a waste-valve seat on the upper face of said fixed-ring, a primary waste-valve held by said collar above the seat on said fixed-ring, and a secondary waste-valve seat held at its outer edge between the extension and the fixed-ring with its body above said waste-passage whereby both waste-valves are closed against the fixed ring when the plunger and collar are approximated.

28. In a compression stop and waste, the combination with a body having a through passage and a main-valve seat, a lateral extension thereof communicating with a waste-outlet, a plunger guided in said extension and forming therewith a waste passage, and a main valve adapted to be seated by the plunger; of a stem having a collar, a screw connection between the plunger and stem, a fixed-ring surrounding the stem and clamped to the extension, a primary waste-valve held by said collar above the fixed-ring, and a secondary waste-valve seat held at its outer edge between the extension and the fixed-ring with its body above said waste-passage whereby both waste-valves are closed against the fixed-ring when the plunger and collar are approximated.

29. In a compression stop and waste, the combination with a body having a through passage and a main-valve seat, a lateral extension thereof communicating with a waste-outlet, a plunger guided in said extension and forming therewith a waste passage, and a main valve adapted to be seated by the plunger; of a stem having a collar, a spring pressing the stem downward, a screw connection between the plunger and stem, a fixed-ring surrounding the stem and having a flange clamped to the extension, and a waste-valve seat held at its outer edge between the extension and the flange of said fixed-ring with its body above said waste-passage whereby the waste-valve is closed against the fixed-ring when the plunger and collar are approximated.

30. In a compression stop and waste, the combination with a body having a through passage and a main-valve seat, a lateral extension thereof communicating with a waste-outlet, a plunger guided in said extension and forming therewith a waste passage, and a main valve adapted to be seated by the plunger; of a stem having a collar, a screw connection between the plunger and stem, a fixed-ring surrounding the stem below its collar, and a waste-valve seat held at its outer edge between the extension and the fixed-ring with its body above said waste-passage whereby the waste-valve is closed against the fixed-ring when the plunger and collar are approximated.

31. In a compression stop and waste, the combination with a body having a through passage and a main-valve seat, a lateral extension thereof communicating with a waste-outlet, a plunger guided in said extension and forming therewith a waste passage, and a main valve adapted to be seated by the plunger; of a stem having a collar fixed upon it, a spring pressing the stem downward, a fixed-ring surrounding the stem, a primary waste-valve held by said collar above the fixed-ring, a secondary waste valve seat held at its outer edge between the extension and the fixed-ring with its body above said waste-passage, and means whereby both waste-valves are closed against the fixed-ring when the plunger and collar are approximated.

32. In a compression stop and waste, the combination with a body having a through passage and a main-valve seat, a lateral extension thereof communicating with a waste-outlet, a plunger guided in said extension and forming therewith a waste passage, and a main valve adapted to be seated by the plunger; of a stem having a collar fixed upon it, a fixed-ring surrounding the stem, a primary waste-valve held by said collar above the fixed-ring, a secondary waste-valve seat held at its outer edge between the extension and fixed-ring with its body above said waste-passage, and means whereby both waste-valves are closed against the fixed ring when the plunger and collar are approximated.

33. In a compression stop and waste, the combination with a body having a through passage and a main-valve seat, a lateral extension thereof communicating with a waste-outlet, a plunger guided in said extension and forming therewith a waste passage, and a main valve adapted to be seated by the plunger; of a stem having a collar upon it, a spring pressing the collar downward, a fixed-ring surrounding the stem, a washer held at its outer edge between the extension and the fixed-ring with its body above said waste-passage, and means whereby the washer is closed against the passage when the plunger and collar are approximated.

34. In a compression stop and waste, the combination with a body having a through passage and a main-valve seat, a lateral extension thereof communicating with a waste-outlet, a plunger guided in said extension and forming therewith a waste passage, and a main valve adapted to be seated by the plunger; of a stem having a collar upon it, a fixed-ring surrounding the stem, a waste-washer held at its outer edge between the extension and the fixed-ring with its body above said waste-passage, and means whereby the washer is closed against the fixed ring and passage when the plunger and collar are approximated.

35. In a compression stop and waste, the combination with a body having a through passage and a main-valve seat, a lateral extension thereof, a plunger guided in said extension and forming therewith a waste passage, a main valve carried by the plunger, a bonnet clamped to the extension and having a waste-outlet, and a packed nut on the bonnet above said outlet; of a fixed-ring within the bonnet below said outlet and having a valve seat, a stem extending through said nut and packing and through the fixed-ring and having a collar above the latter, a spring in the bonnet bearing on said collar, a primary waste-valve held in said collar, a secondary-waste-valve seat held by the fixed-ring above said passage, and a screw connection between the plunger and stem whereby the primary waste valve closes before the main valve opens and the initial pressure never reaches the packed nut.

36. In a compression stop and waste, the combination with a body having a through passage and a main-valve seat, a lateral extension thereof, a plunger guided in said extension and forming therewith a waste passage, a main valve carried by the plunger, a bonnet clamped to the extension and having a waste-outlet, and a packed nut on the bonnet above said outlet; of a fixed-ring within the bonnet below said outlet and having a valve seat, a stem extending through said nut and packing and through the fixed-ring and having a collar above the latter, a spring in the bonnet bearing on said collar, a primary waste-valve held in said collar, a secondary-waste-valve seat held by the fixed-ring above said passage, and a screw connection between the plunger and stem whereby the primary waste valve closes before the main valve opens, the secondary-waste valve is closed when the main valve is fully open, and the initial pressure never reaches the packed nut.

37. In a compression stop and waste, the combination with a body having a through passage and a main-valve seat, a lateral extension thereof, a plunger guided in said extension and forming therewith a waste passage, a main valve carried by the plunger, a bonnet clamped to the extension and having a waste-outlet, and a packed nut on the bonnet above said outlet; of a fixed-ring below said outlet and having a valve seat, a stem extending through said nut and packing and through the fixed-ring and having a collar above the latter, a primary waste-valve held in said collar, a secondary-waste-valve seat held by the fixed-ring above said passage, and means for approximating and separating the plunger and stem whereby the primary-waste valve closes before the main valve opens and the initial pressure never reaches the packed nut.

38. In a compression stop and waste, the combination with a body having a through passage and a main-valve seat, a lateral extension thereof, a plunger guided in said extension and forming therewith a waste passage, a main valve carried by the plunger, a bonnet clamped to the extension and having a waste-outlet, and a packed nut on the bonnet above said outlet; of a fixed-ring below said outlet and having a valve seat, a stem extending through said nut and packing and through the fixed-ring and having a collar above the latter, a primary waste-valve held in said collar, a secondary-waste-valve seat held by the fixed-ring above said passage, and means for approximating and separating the plunger and stem whereby the primary-waste valve closes before the main valve opens, the secondary-waste valve is closed by the plunger as the latter fully opens the main valve, and the initial pressure never reaches the packed nut.

In testimony whereof I have signed my name to the foregoing specification this 17th day of August, 1907, in the presence of two subscribing witnesses.

ANTON C. SCHUERMANN.

Witnesses:

VIRGINIA HAMILTON,
JOHN L. WADDELL.